(12) United States Patent
Uemura (10) Patent No.: US 8,542,293 B2
(45) Date of Patent: *Sep. 24, 2013

(54) IMAGE PICKUP APPARATUS, METHOD FOR CONTROLLING THE IMAGE PICKUP APPARATUS, AND STORAGE MEDIUM

(75) Inventor: Hidetaka Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,952

(22) Filed: May 23, 2012

(65) Prior Publication Data

US 2012/0229676 A1    Sep. 13, 2012

Related U.S. Application Data

(63) Continuation of application No. 12/419,179, filed on Apr. 6, 2009, now Pat. No. 8,028,041.

(30) Foreign Application Priority Data

Apr. 8, 2008    (JP) ................................. 2008-100807

(51) Int. Cl.
*H04N 5/76*    (2006.01)
*G06K 9/46*    (2006.01)
*G11B 27/00*    (2006.01)

(52) U.S. Cl.
USPC .................... 348/231.2; 382/232; 386/278

(58) Field of Classification Search
USPC ............. 348/231.2, 231.7, 231.99; 382/232; 386/278

See application file for complete search history.

(56) References Cited

U.S. PATENT DOCUMENTS

| | | | |
|---|---|---|---|
| 7,706,679 B2 * | 4/2010 | Sawano .................... 396/310 |
| 2003/0184658 A1 * | 10/2003 | Fredlund et al. ........... 348/220.1 |
| 2008/0158389 A1 * | 7/2008 | Jeong ....................... 348/231.7 |
| 2008/0192129 A1 * | 8/2008 | Walker et al. .............. 348/231.2 |

* cited by examiner

*Primary Examiner* — Trung Diep
(74) *Attorney, Agent, or Firm* — Canon U.S.A., Inc., IP Division (57) ABSTRACT

An image pickup apparatus includes an image pickup unit that picks up an image of a subject; an internal memory; a removable external memory; a compression processing unit that compresses the image picked up by the image pickup unit to generate a picked-up image; a recording processing unit that records the picked-up image in the removable external memory and records the compressed image corresponding to the picked-up image in the internal memory; and an editing processing unit that edits the picked-up image in the removable external memory and the compressed image in the internal memory. For a compressed image in the internal memory, a reservation for editing a picked-up image corresponding to the compressed image and recorded in the unmounted removable external memory can be made.

12 Claims, 11 Drawing Sheets

FIG. 3A
EDITING TYPE
SELECTION SCREEN

FIG. 3B
EDITING EXECUTION
CONFIRMATION SCREEN

FIG. 3C
WHEN PICKED-UP IMAGE IS
RECORDED IN INTERNAL
MEMORY OR CURRENTLY
MOUNTED EXTERNAL
MEMORY

FIG. 3D
WHEN PICKED-UP IMAGE IS
RECORDED IN CURRENTLY
UNMOUNTED EXTERNAL
MEMORY

FIG. 6A
EDITING TYPE
SELECTION SCREEN

FIG. 6B
"ADD TO PLAYLIST"
EXECUTION CONFIRMATION
SCREEN

FIG. 6C
WHEN PICKED-UP
IMAGE IS RECORDED IN
INTERNAL MEMORY

FIG. 6D
WHEN PICKED-UP IMAGE IS RECORDED IN
CURRENTLY MOUNTED EXTERNAL MEMORY (1) COPYING EXECUTION CONFIRMATION SCREEN   (2) "ADD TO PLAYLIST" COMPLETION SCREEN

FIG. 6E
WHEN PICKED-UP IMAGE IS RECORDED IN
CURRENTLY UNMOUNTED EXTERNAL MEMORY

(a) IMAGE SELECTION SCREEN

DISPLAY MENU (b) MENU SCREEN

EXECUTE PLAYBACK

DETERMINE (c) MEMORY INFORMATION DISPLAY SCREEN

IMAGE PICKUP APPARATUS, METHOD FOR CONTROLLING THE IMAGE PICKUP APPARATUS, AND STORAGE MEDIUM

CROSS REFERENCE TO RELATED APPLICATIONS

This application is a Continuation of U.S. patent application Ser. No. 12/419,179 filed Apr. 6, 2009, which claims priority to Japanese Patent Application No. 2008-100807 filed Apr. 8, 2008, each of which are hereby incorporated by reference herein in their entireties.

BACKGROUND OF THE INVENTION

1. Field of the Invention

The present invention relates to an image pickup apparatus capable of recording images in an internal recording medium and a removable external recording medium, a method for controlling the image pickup apparatus, and a computer-readable storage medium having computer-executable instructions. In particular, the present invention relates to a technique for facilitating management of images recorded in a plurality of recording media.

2. Description of the Related Art

Image pickup apparatuses having a plurality of different recording media, such as an external memory and an internal memory, has become widespread. This has increased the importance of a technique for managing images recorded in such memories. Examples of the technique for managing images include one in which picked-up images are recorded in a large memory (external memory), and compressed images corresponding to the picked-up images are recorded in a small memory (internal memory) (see, Japanese Patent Laid-Open No. 2006-324708). Thus, even when the picked-up images are moved out of the image pickup apparatus, the user can check the picked-up images on the image pickup apparatus.

However, when the above-described technique for managing images in the image pickup apparatus having the internal and external memories is used, two different types of recorded images (a picked-up image and a compressed image) are generated for one image.

In this case, performing an editing operation on each of the two different types of recorded images may be very burdensome for the user.

Additionally, to identify a specific external memory in which a picked-up image the user is looking for is recorded, the user has to insert the external memory into the image pickup apparatus every time. This operation may also be very burdensome for the user.

SUMMARY OF THE INVENTION

An aspect of the present invention is to provide an image pickup apparatus including an image pickup unit configured to pick up an image of a subject; an internal recording medium; a mounting unit in which a removable external recording medium can be mounted, i.e., the mounting unit is configured to have the removable external recording medium mounted therein; a compression processing unit configured to compress the image picked up by the image pickup unit to generate a compressed image; a recording processing unit configured to record the image picked up by the image pickup unit as a picked-up image in the removable external recording medium, and record the compressed image corresponding to the picked-up image recorded in the removable external recording medium in the internal recording medium; an editing processing unit configured to edit the picked-up image recorded in the external recording medium and the compressed image recorded in the internal recording medium; and a control unit configured to refer to the compressed image recorded in the internal recording medium to allow a reservation for performing an editing operation on the picked-up image recorded in the external recording medium when the removable external recording medium is not mounted in the mounting unit.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the attached drawings. In the exemplary embodiments described below, the present invention is applied to a digital video camera.

Figure 1:
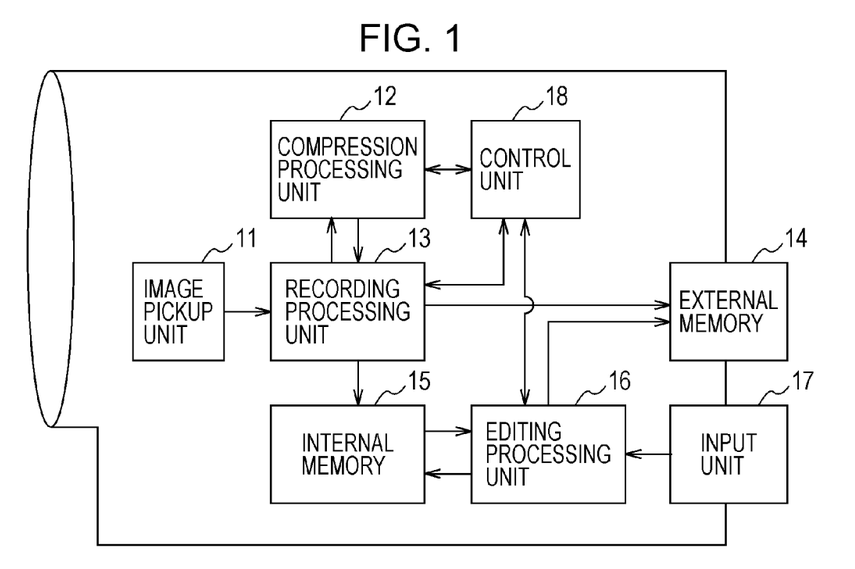
FIG. 1 is a block diagram schematically illustrating a configuration of a digital video camera according to a first exemplary embodiment of the present invention.

FIG. 1 is a block diagram schematically illustrating a configuration of a digital video camera according to a first exemplary embodiment of the present invention. An image pickup unit 11 picks up an image of a subject. A compression processing unit 12 compresses the image picked up by the image pickup unit 11 to generate a picked-up image. At the same time, the compression processing unit 12 compresses the image picked up by the image pickup unit 11 at a compression ratio greater than that for the picked-up image to generate a compressed image.

A recording processing unit 13 performs recording processing to record the picked-up image and the compressed image in an external memory 14 and an internal memory 15. The external memory 14 is a removable external recording medium. Here, the external memory 14 is a memory card having a non-volatile storage unit. The digital video camera includes a mounting unit for mounting the external memory 14. The recording processing unit 13 is capable of recording data in the memory card mounted in the mounting unit. The internal memory 15 is an internal recording medium. In the first exemplary embodiment, a picked-up image can be recorded in the external memory 14 or the internal memory 15. When the picked-up image is recorded in the external memory 14, a compressed image corresponding to the picked-up image is recorded in both the external memory 14 and the internal memory 15. When the picked-up image is recorded in the internal memory 15, the corresponding compressed image is recorded only in the internal memory 15.

An editing processing unit 16 edits picked-up images and compressed images recorded in the external memory 14 and the internal memory 15. In the first exemplary embodiment, editing operations include "protect", "delete", "divide", and "add to playlist". An input unit 17 includes an operation unit used to select an image to be edited and a type of editing operation to be performed.

A control unit 18 controls an overall operation of the digital video camera. The control unit 18 serves as a display processing unit that displays, on a display unit, compressed images and a playlist in an index format. Additionally, the control unit 18 serves as an editing reservation unit that allows an editing reservation to be made. That is, for a compressed image recorded in the internal memory 15, the control unit 18 accepts an editing reservation for editing a picked-up image that corresponds to the compressed image and is recorded in an unmounted external memory 14 that is not currently mounted in the digital video camera.

Figure 2:
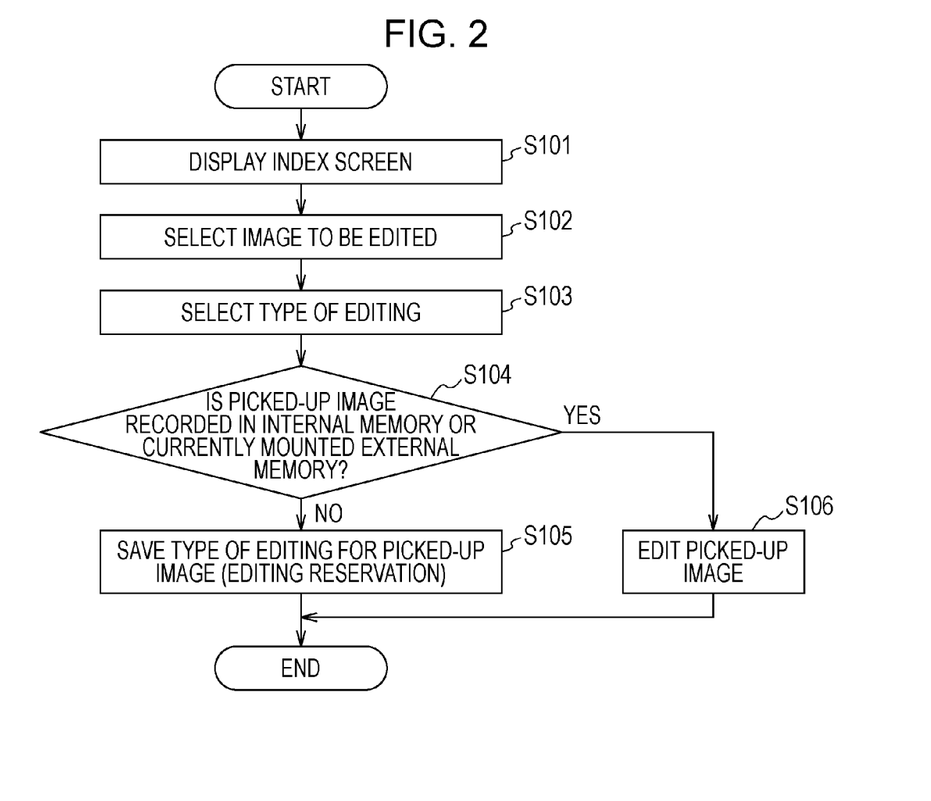
FIG. 2 is a flowchart illustrating an example of a process of performing an editing operation ("protect", "delete", or "divide") and making a reservation for the editing operation in the digital video camera of the first exemplary embodiment.

FIG. 2 is a flowchart illustrating an example of a process of performing an editing operation (e.g., "protect", "delete", or "divide") and making a reservation for the editing operation in the digital video camera of the first exemplary embodiment. First, in step S101, the digital video camera displays, in an index format, compressed images recorded in the internal memory 15. In step S102, the user selects an image to be edited from the compressed images displayed in an index format. In step S103, the user selects a type of editing operation (e.g., "protect", "delete", or "divide") to be performed on the selected image.

"Protect" refers to a protecting operation for setting protection against deletion of data. Specifically, a protect flag is recorded in a header portion of the data. "Delete" refers to a deleting operation for deleting data in a memory card or an internal memory. "Divide" refers to a dividing operation for extracting a moving image of desired duration from moving data to generate new moving image data.

The above three types of editing operations are discussed in the present specification. However, editing operations are not limited to these three types. Examples of the editing operations may further include image color correction, image size conversion, and image rotation. Processing for combining a plurality of pieces of moving image data may also be included.

In step S104, the digital video camera determines whether a picked-up image corresponding to the selected compressed image is recorded in the internal memory 15 or a currently mounted external memory 14, and thus is in an editable state.

If it is determined in step S104 that the picked-up image is not recorded in either of the internal memory 15 and the currently mounted external memory 14, that is, if it is determined that the picked-up image is recorded in a currently unmounted external memory 14 and thus is not in an editable state (No in step S104), the process proceeds to step S105. In step S105, the digital video camera makes an editing reservation on the compressed image recorded in the internal memory 15. For example, the type of editing operation selected in step S103 is saved in association with the compressed image recorded in the internal memory 15.

On the other hand, if it is determined in step S104 that the picked-up image is recorded in the internal memory 15 or the currently mounted external memory 14, and thus is in an editable state (Yes in step S104), the process proceeds to step S106. In step S106, the digital video camera executes the editing operation on the picked-up image recorded in the internal memory 15 or the currently mounted external memory 14.

With the process described above, even when the picked-up image corresponding to the selected compressed image is recorded in the currently unmounted external memory 14 and thus is not in an editable state, an editing reservation for editing the picked-up image can be made on the compressed image. Of the compressed images displayed in an index format, one on which an editing reservation has been made can be displayed in a manner different from that for the others on which no editing reservation is made. This makes it possible to visually inform the user of the compressed image on which an editing reservation has been made.

It will be understood that it may be more convenient for the user if the editing reservation made on the compressed image can be cancelled.

Figure 3A:
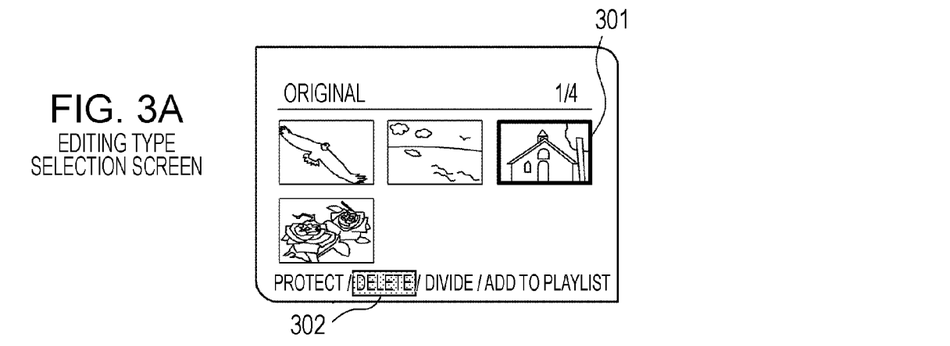
FIG. 3A to FIG. 3D illustrate examples of the transition of screens displayed in a process of performing an editing operation ("protect", "delete", or "divide") and making a reservation for the editing operation in the digital video camera of the first exemplary embodiment.

FIG. 3A to FIG. 3D illustrate examples of the transition of screens displayed in a process of performing an editing operation (e.g., "protect", "delete", or "divide") and making a reservation for the editing operation in the digital video camera of the first exemplary embodiment. FIG. 3A illustrates an editing type selection screen on which, from a list of compressed images displayed in an index format, the user selects an image to be edited and a type of editing operation to be performed. The editing type selection screen allows the user to select an image to be edited by moving a focus 301, and allows the user to select a type of editing operation to be performed by moving a focus 302. In accordance with the type of editing operation selected on the editing type selection screen of FIG. 3A, the screen transitions to an editing execution confirmation screen of FIG. 3B. As illustrated, after "delete" is selected on the editing type selection screen of FIG. 3A, the editing execution confirmation screen of FIG. 3B prompts the user to determine whether to execute "delete" (corresponding to steps S101 to S103 in FIG. 2).

Figure 3B:
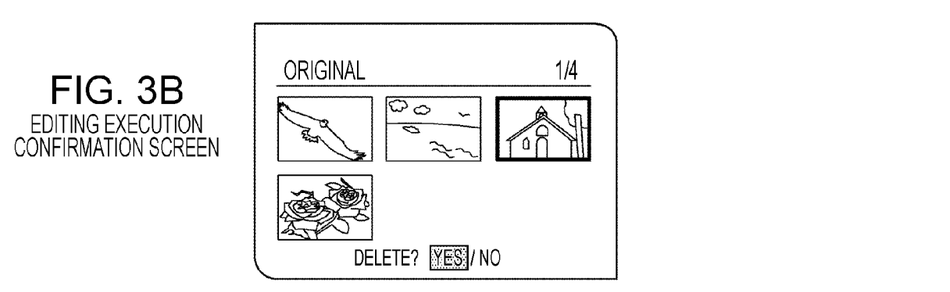

If "Yes" is selected on the editing execution confirmation screen of FIG. 3B, the digital video camera determines whether a picked-up image corresponding to the selected compressed image is recorded in the internal memory 15 or the currently mounted external memory 14, and thus is in an editable state (corresponding to step S104 in FIG. 2).

Figure 3C:
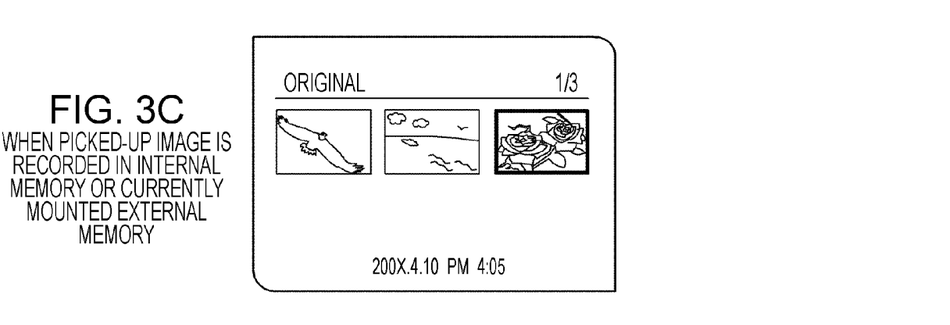

If the picked-up image is recorded in the internal memory 15 or the currently mounted external memory 14, and thus is in an editable state, the digital video camera executes the editing operation on the picked-up image recorded in the internal memory 15 or the currently mounted external memory 14 (corresponding to step S106 in FIG. 2). Thus, as illustrated in FIG. 3C, one of the compressed images displayed in an index format is deleted, and the user is informed that the deletion has been executed.

Figure 3D:
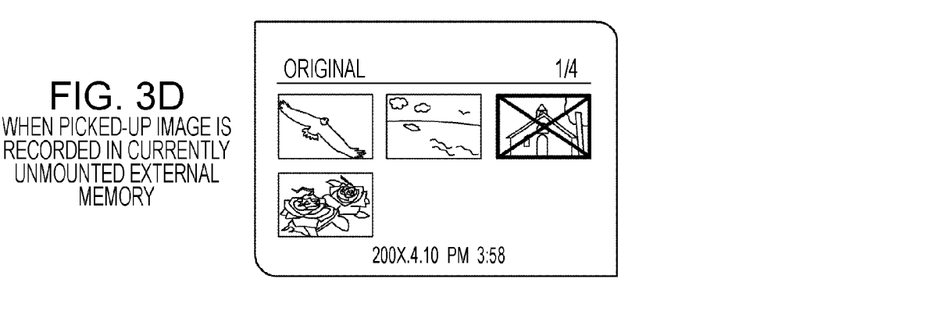

On the other hand, if the picked-up image corresponding to the selected compressed image is recorded in the currently unmounted external memory 14 and thus is not in an editable state, the digital video camera makes an editing reservation on the selected compressed image recorded in the internal memory 15 (corresponding to step S105 in FIG. 2). Then, as illustrated in FIG. 3D, one of the compressed images displayed in an index format is presented in a display format indicating that the editing reservation has been made thereon. For example, an "X" mark is superimposed on a compressed image on which a "delete" reservation has been made.

Figure 4:
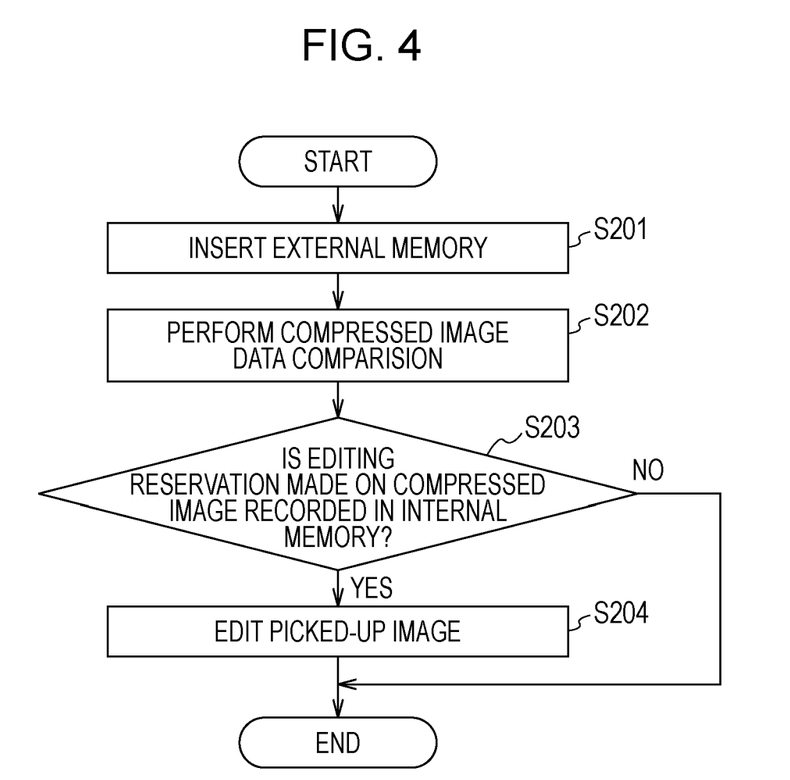
FIG. 4 is a flowchart illustrating an example of a process of executing an editing operation on a picked-up image for which an editing ("protect", "delete", or "divide") reservation has been made in the digital video camera of the first exemplary embodiment.

FIG. 4 is a flowchart illustrating an example of a process of executing an editing operation on a picked-up image for which an editing ("protect", "delete", or "divide") reservation has been made in the digital video camera of the first exemplary embodiment. First, in step S201, when the user inserts the external memory 14 into the digital video camera, the control unit 18 of the digital video camera detects that the external memory 14 has been mounted in the mounting unit. Then, in step S202, the digital video camera compares data of a compressed image recorded in the internal memory 15 with data of a compressed image recorded in the external memory 14 mounted in step S201. After the data comparison in step S202, the digital video camera determines in step S203 whether an editing reservation is made on the compressed image recorded in the internal memory 15.

If it is determined in step S203 that the editing reservation is made on the compressed image recorded in the internal memory 15 (Yes in step S203), the process proceeds to step S204. In step S204, the digital video camera reflects a type of the editing operation for which the editing reservation is made on the compressed image recorded in the internal memory 15 to a picked-up image corresponding to the compressed image and recorded in the external memory 14. Before automatic execution of the editing operation, a massage, such as "Do you want to execute the editing operation?", may be presented to the user.

With the process described above, when the external memory 14 is inserted into the digital video camera, a type of editing operation for which an editing reservation is made on a compressed image recorded in the internal memory 15 can be automatically reflected to the corresponding picked-up image recorded in the external memory 14.

An editing reservation for any of various types of editing operations, such as deletion, division, image color correction, image size conversion, and image rotation, can be made on a compressed image recorded in the internal memory 15. Then, when the external memory 14 is inserted into the digital video camera, the editing operation for which the editing reservation has been made on the compressed image recorded in the internal memory 15 can be automatically reflected to a picked-up image recorded in the external memory 14 and corresponding to the compressed image.

Figure 5:
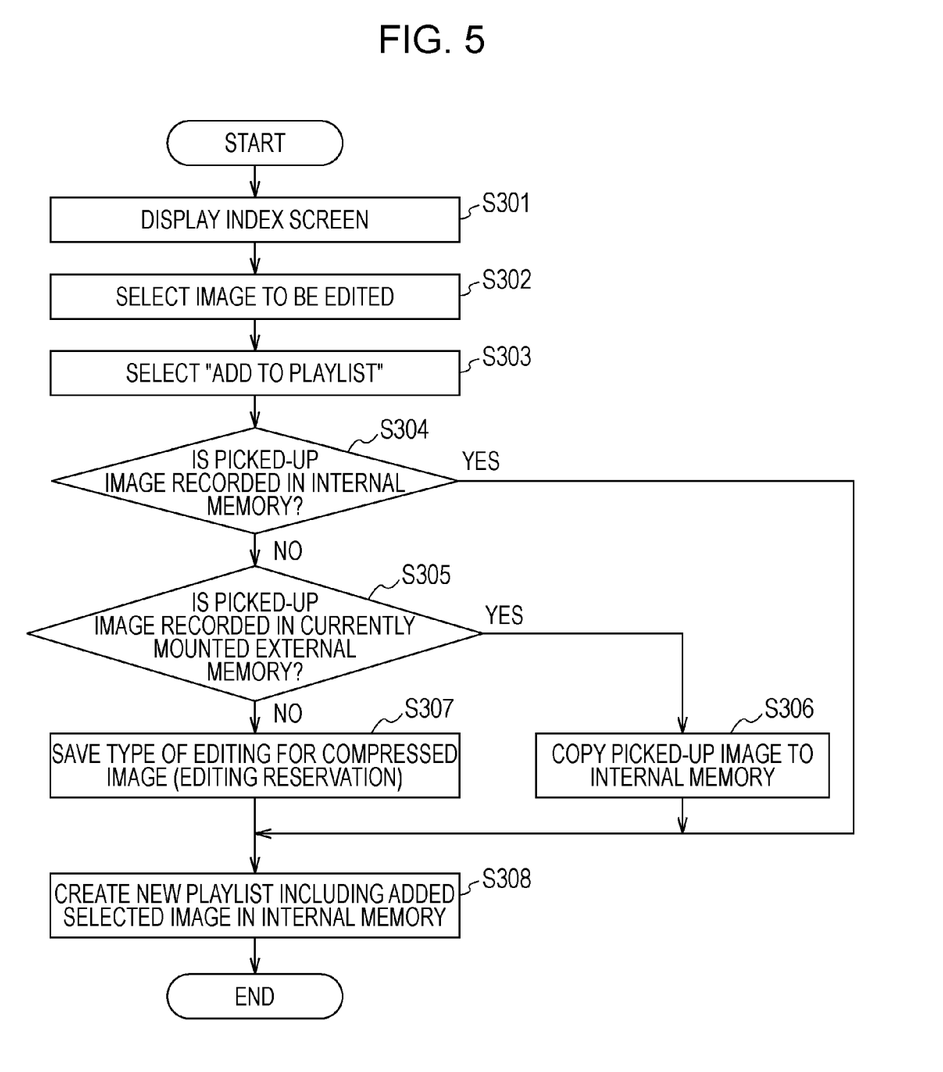
FIG. 5 is a flowchart illustrating an example of a process of performing an editing operation ("add to playlist") and making a reservation for the editing operation in the digital video camera of the first exemplary embodiment.

FIG. 5 is a flowchart illustrating an example of a process of performing an editing operation ("add to playlist") and making a reservation for the editing operation in the digital video camera of the first exemplary embodiment. First, in step S301, the digital video camera displays, in an index format, compressed images recorded in the internal memory 15. In step S302, the user selects an image to be edited from the compressed images displayed in an index format. In step S303, the user selects an editing operation ("add to playlist") for the selected image.

A playlist refers to a list of image files from which the user can select only an image file to be played back or printed. By referring to the playlist for playback or printing, the user can sequentially select only image files to be played back or printed. "Add to playlist" refers to an operation for adding specified information about a selected image file to a playlist.

In step S304, the digital video camera determines whether a picked-up image corresponding to the compressed image selected in step S302 is recorded in the internal memory 15.

If it is determined in step S304 that the picked-up image is recorded in the internal memory 15 (Yes in step S304), the process proceeds to step S308. In step S308, the digital video camera executes "add to playlist" on the picked-up image recorded in the internal memory 15, and creates a new playlist in the internal memory 15.

On the other hand, if it is determined in step S304 that the picked-up image is not recorded in the internal memory 15 (No in step S304), the process proceeds to step S305. In step S305, the digital video camera determines whether the picked-up image is recorded in a currently mounted external memory 14.

If it is determined in step S305 that the picked-up image is recorded in the currently mounted external memory 14 (Yes in step S305), the process proceeds to step S306. In step S306, the digital video camera copies the picked-up image recorded in the currently mounted external memory 14 to the internal memory 15. Before the copying, a notification message may be displayed to visually inform the user of execution of the copying. Then, in step S308, the digital video camera executes "add to playlist" on the picked-up image copied to the internal memory 15, and creates a new playlist in the internal memory 15.

On the other hand, if it is determined in step S305 that the picked-up image is not recorded in the currently mounted external memory 14 (No in step S305), that is, if it is determined that the picked-up image is recorded in a currently unmounted external memory 14 and thus cannot be added to the playlist, the process proceeds to step S307. In step S307, the digital video camera makes an "add to playlist" reservation on the selected compressed image recorded in the internal memory 15. Of the compressed images displayed in an index format, the one on which the "add to playlist" reservation has been made is displayed in a manner different from that for the others on which the "add to playlist" reservation is not made. This visually informs the user of the compressed image on which the "add to playlist" reservation has been made. Then, in step S308, the digital video camera executes "add to playlist" on the compressed image selected by the user, and creates a new playlist in the internal memory 15. Thus, the added compressed image is displayed on an index screen for the playlist. However, the corresponding picked-up image, which is recorded in the currently unmounted external memory 14, cannot be played back.

Figure 6A:
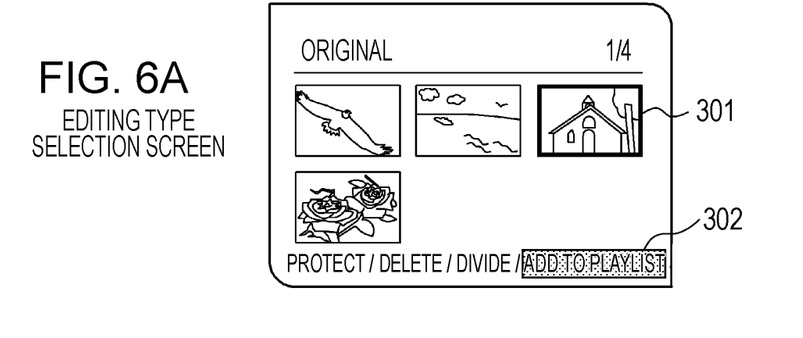
FIG. 6A to FIG. 6E illustrate examples of the transition of screens displayed in a process of performing an editing operation ("add to playlist") and making a reservation for the editing operation in the digital video camera of the first exemplary embodiment.
Figure 6B:
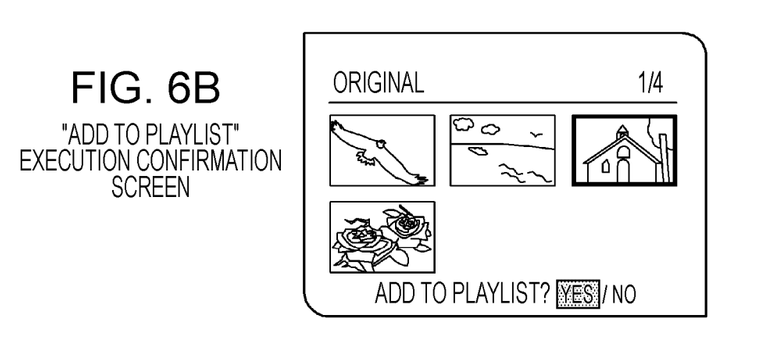

FIG. 6A to FIG. 6E illustrate examples of the transition of screens displayed in a process of performing an editing operation ("add to playlist") and making a reservation for the editing operation in the digital video camera of the first exemplary embodiment. FIG. 6A illustrates an editing type selection screen, and FIG. 6B illustrates an editing execution confirmation screen. FIG. 6A and FIG. 6B are equivalent to FIG. 3A and FIG. 3B, respectively. After "add to playlist" is selected on the editing type selection screen of FIG. 6A, the editing execution confirmation screen of FIG. 6B prompts the user to determine whether to execute "add to playlist" (corresponding to steps S301 to S303 in FIG. 5).

If "Yes" is selected on the editing execution confirmation screen of FIG. 6B, the digital video camera determines whether a picked-up image corresponding to the selected compressed image is recorded in the internal memory 15 (corresponding to step S304 in FIG. 5).

Figure 6C:
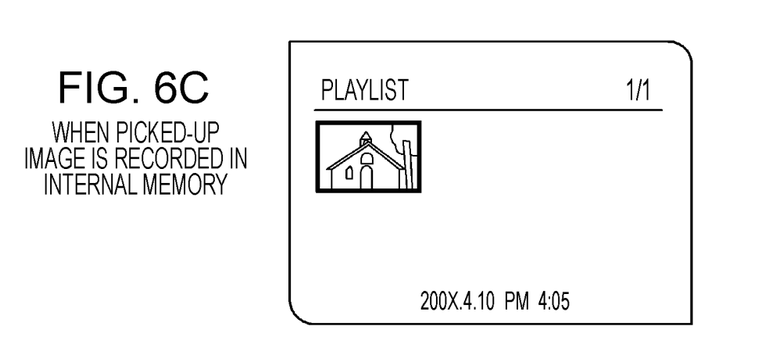

If the picked-up image is recorded in the internal memory 15, the digital video camera executes "add to playlist" on the picked-up image recorded in the internal memory 15 and creates a new playlist in the internal memory 15 (corresponding to step S308 in FIG. 5). Thus, as illustrated in FIG. 6C, the added picked-up image is displayed on the index screen for the playlist.

Figure 6D:
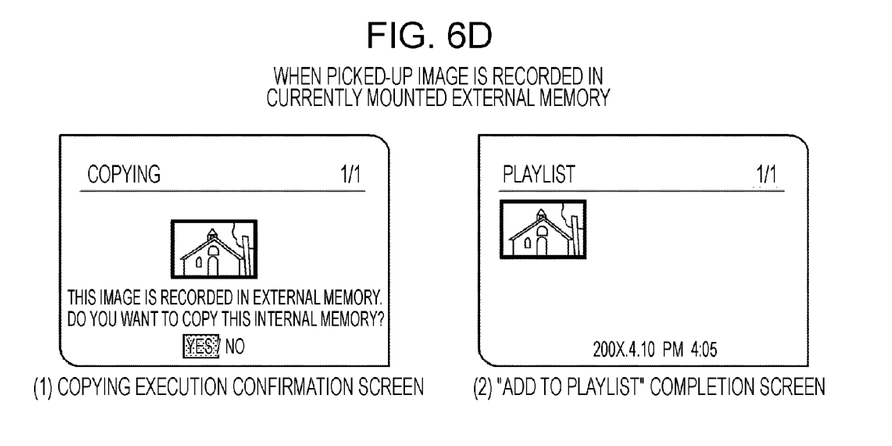

If the picked-up image is recorded in the currently mounted external memory 14, the screen transitions to a copying execution confirmation screen of (1) in FIG. 6D. If "Yes" is selected on the copying execution confirmation screen of (1) in FIG. 6D, the digital video camera copies the picked-up image recorded in the currently mounted external memory 14 to the internal memory 15 (corresponding to step S306 in FIG. 5). After the copying, the digital video camera executes "add to playlist" on the picked-up image and creates a new playlist in the internal memory 15 (corresponding to step S308 in FIG. 5). In this case, as illustrated in (2) of FIG. 6D, the added picked-up image is displayed on the index screen for the playlist.

Figure 6E:
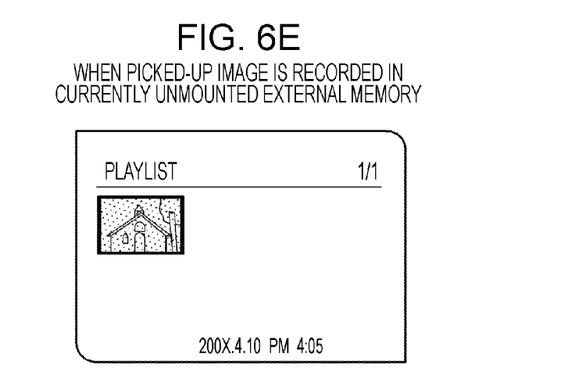

If the picked-up image is recorded in the currently unmounted external memory 14 and thus cannot be added to the playlist, the digital video camera makes an "add to playlist" reservation on the corresponding compressed image recorded in the internal memory 15 (corresponding to step S307 in FIG. 5). In this case, as illustrated in FIG. 6E, the added compressed image is displayed on the index screen for the playlist. On this index screen for the playlist, the added compressed image is displayed in a manner indicating that it is a compressed image. In other words, the added compressed image is displayed in a manner informing the user that the corresponding picked-up image is recorded in the currently unmounted external memory 14 and thus cannot be either played back or printed. If an instruction to execute playback or printing is still received from the user, a warning may be given to the user.

Figure 7:
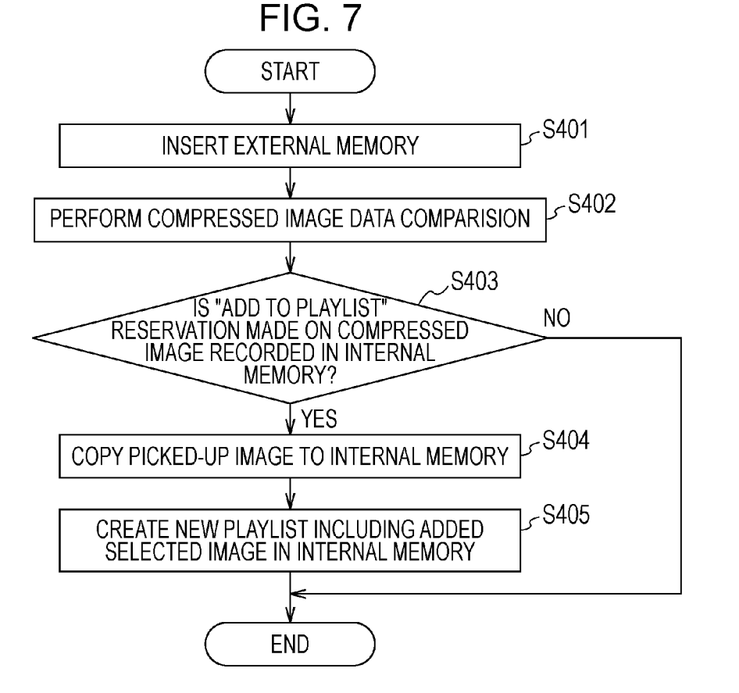
FIG. 7 is a flowchart illustrating an example of a process of executing "add to playlist" on a picked-up image for which an editing ("add to playlist") reservation has been made in the digital video camera of the first exemplary embodiment.

FIG. 7 is a flowchart illustrating an example of a process of executing "add to playlist" on a picked-up image for which an editing ("add to playlist") reservation has been made in the digital video camera of the first exemplary embodiment. First, in step S401, the user inserts the external memory 14 into the digital video camera. In step S402, the digital video camera compares data of a compressed image recorded in the internal memory 15 with data of a compressed image recorded in the external memory 14 inserted in step S401. After the data comparison in step S402, the digital video camera determines in step S403 whether an "add to playlist" reservation is made on the compressed image recorded in the internal memory 15.

If it is determined in step S403 that the "add to playlist" reservation is made on the compressed image recorded in the internal memory 15 (Yes in step S403), the process proceeds to step S404. In step S404, the digital video camera copies a picked-up image corresponding to the compressed image and recorded in the currently mounted external memory 14 to the internal memory 15. Before the copying, a notification message may be displayed to visually inform the user of execution of the copying. In step S405, the digital video camera executes "add to playlist" on the picked-up image copied to the internal memory 15 in step S404, and creates a new playlist in the internal memory 15.

With the process described above, when the external memory 14 is inserted into the digital video camera, an "add to playlist" reservation made on a compressed image recorded in the internal memory 15 can be automatically reflected to the corresponding picked-up image recorded in the external memory 14.

In the first exemplary embodiment described above, it is possible to make a reservation for an editing operation on a compressed image recorded in the internal memory 15. Then, when the external memory 14 in which a picked-up image corresponding to the compressed image is inserted into the digital video camera, the editing operation can be executed on the picked-up image. Thus, it is possible to reduce the user's burden of performing an editing operation on each of two different types of recorded images.

Figure 8:
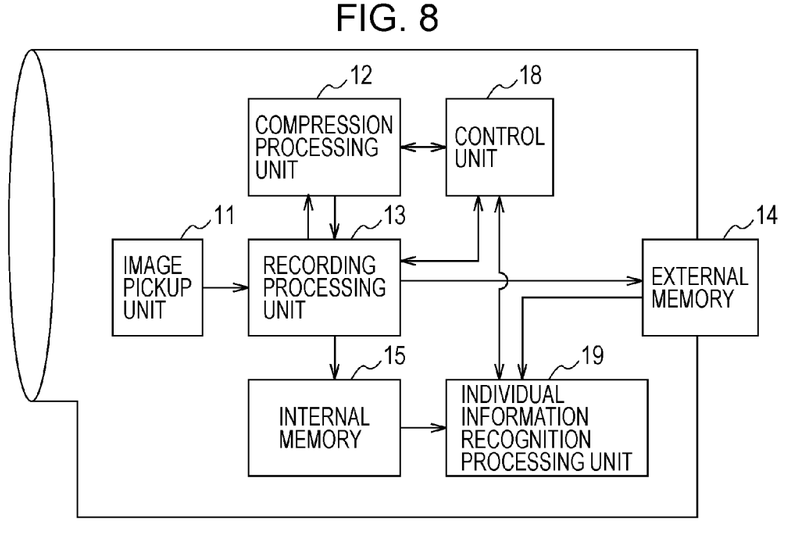
FIG. 8 is a block diagram schematically illustrating a configuration of a digital video camera according to a second exemplary embodiment of the present invention.

FIG. 8 is a block diagram schematically illustrating a configuration of a digital video camera according to a second exemplary embodiment of the present invention. The digital video camera of the second exemplary embodiment has all the functions described in the first exemplary embodiment. The second exemplary embodiment provides an additional function realized after an editing reservation is made in the process of the first exemplary embodiment.

In the second exemplary embodiment, components equivalent to those of the digital video camera of the first exemplary embodiment are given the same reference numerals. An image pickup unit 11 picks up an image of a subject. A compression processing unit 12 compresses the image picked up by the image pickup unit 11 to generate a picked-up image. At the same time, the compression processing unit 12 compresses the image picked up by the image pickup unit 11 at a compression ratio greater than that for the picked-up image to generate a compressed image.

A recording processing unit 13 performs recording processing to record the picked-up image and the compressed image in an external memory 14 and an internal memory 15. The external memory 14 is a removable external recording medium. The internal memory 15 is an internal recording medium. In the second exemplary embodiment, a picked-up image can be recorded in the external memory 14 or the internal memory 15. When the picked-up image is recorded in the external memory 14, a compressed image corresponding to the picked-up image is recorded in both the external memory 14 and the internal memory 15. When the picked-up image is recorded in the internal memory 15, the corresponding compressed image is recorded only in the internal memory 15.

A control unit 18 controls an overall operation of the digital video camera. The control unit 18 serves as a display processing unit that displays, on a display unit, compressed images in an index format.

An individual information recognition processing unit 19 recognizes individual information individually held by the external memory 14. In the second exemplary embodiment, the individual information includes, but is not limited to, a manufacturer's name, a memory capacity (recording capacity), and a serial number. The individual information may be any information that allows the user to identify the external memory 14.

Figure 9:
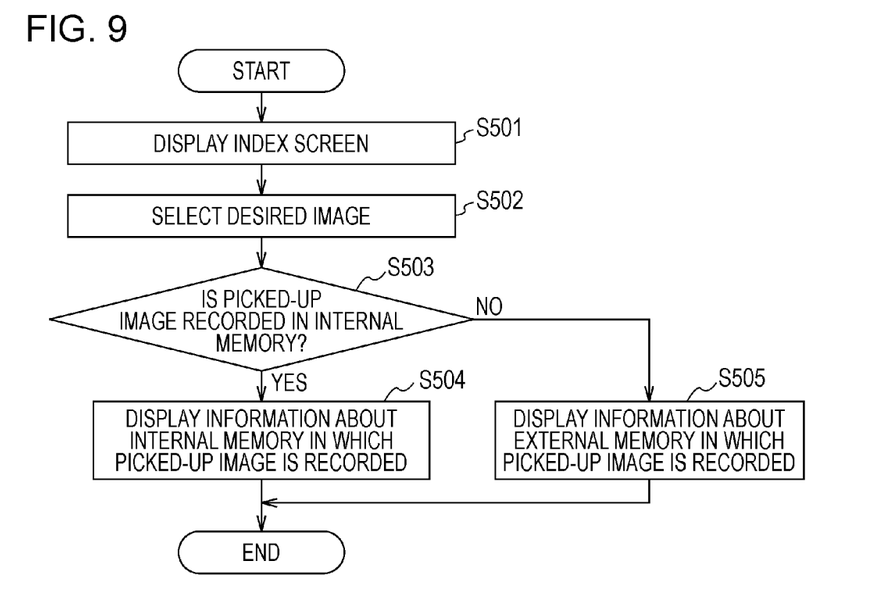
FIG. 9 is a flowchart illustrating an example of a process in which an image is selected from compressed images displayed in an index format in the digital video camera of the second exemplary embodiment.

FIG. 9 is a flowchart illustrating an example of a process in which an image is selected from compressed images displayed in an index format in the digital video camera of the second exemplary embodiment. First, in step S501, the digital video camera displays, in an index format, compressed images recorded in the internal memory 15. In step S502, the user selects a desired image from the compressed images displayed in an index format.

In step S503, the digital video camera determines whether a picked-up image corresponding to the selected compressed image is recorded in the internal memory 15.

If it is determined in step S503 that the picked-up image is recorded in the internal memory 15 (Yes in step S503), the process proceeds to step S504. In step S504, the digital video camera displays individual information about the internal memory 15 in which the picked-up image is recorded.

On the other hand, if it is determined in step S503 that the picked-up image is recorded in a currently mounted external memory 14 or a currently unmounted external memory 14 (No in step S503), the process proceeds to step S505. In step S505, the digital video camera displays individual information about the external memory 14 in which the picked-up image is recorded. For visual notification to the user, individual information about the external memory 14 in which the picked-up image is recorded is displayed in a different manner depending on whether the external memory 14 is currently mounted in the digital video camera.

With the process described above, information about the memory in which the picked-up image is recorded can be presented to the user.

Figure 10:
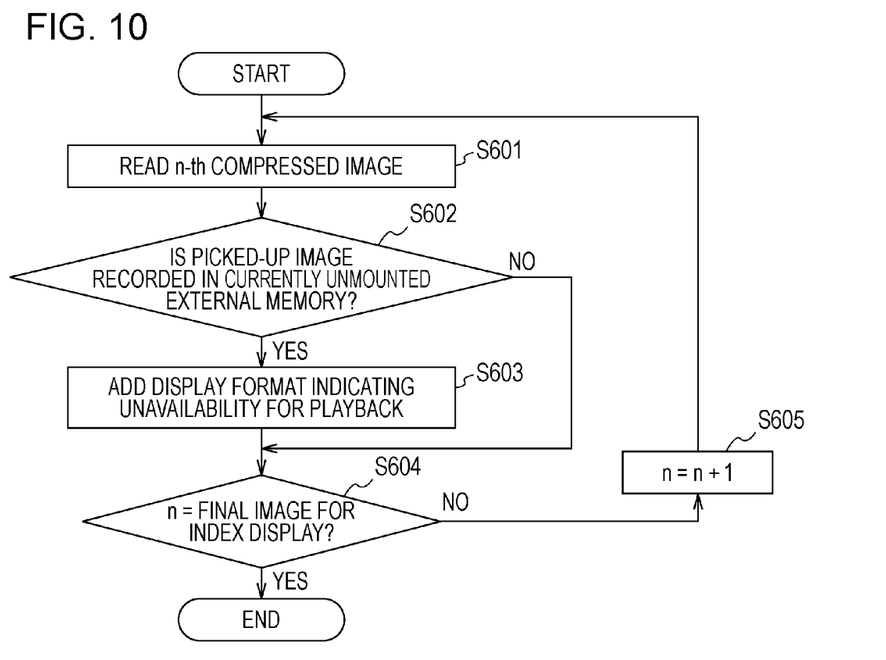
FIG. 10 is a flowchart illustrating an example of a process of generating an index display screen in the digital video camera of the second exemplary embodiment.

FIG. 10 is a flowchart illustrating an example of a process of generating an index display screen in the digital video camera of the second exemplary embodiment. First, in step S601, the digital video camera performs image reading processing to display, in an index format, the n-th compressed image recorded in the internal memory 15.

In step S602, the digital video camera determines whether a picked-up image corresponding to the compressed image read in step S601 is recorded in a currently unmounted external memory 14. If it is determined in step S602 that the picked-up image is recorded in the internal memory 15 or a currently mounted external memory 14 (No in step S602), the process proceeds to step S604. On the other hand, if it is determined in step S602 that the picked-up image is recorded in the currently unmounted external memory 14 (Yes in step S602), the process proceeds to step S603. In step S603, the compressed image read in step S601 is displayed in a manner indicating that it cannot be played back. Then, the process proceeds to step S604.

In step S604, the digital video camera determines whether the compressed image currently being processed is a final image for index display. If it is determined in step S604 that the compressed image currently being processed is not a final image (No in step S604), the process proceeds to step S605. In step S605, a value "n" for the image reading processing is incremented. Then, the process returns to step S601. On the other hand, if it is determined in step S604 that the compressed image currently being processed is a final image (Yes in step S604), the process proceeds to step S501 in FIG. 9.

Then, in step S501 of FIG. 9, the digital video camera displays, in an index format, compressed images recorded in the internal memory 15.

Figure 11:
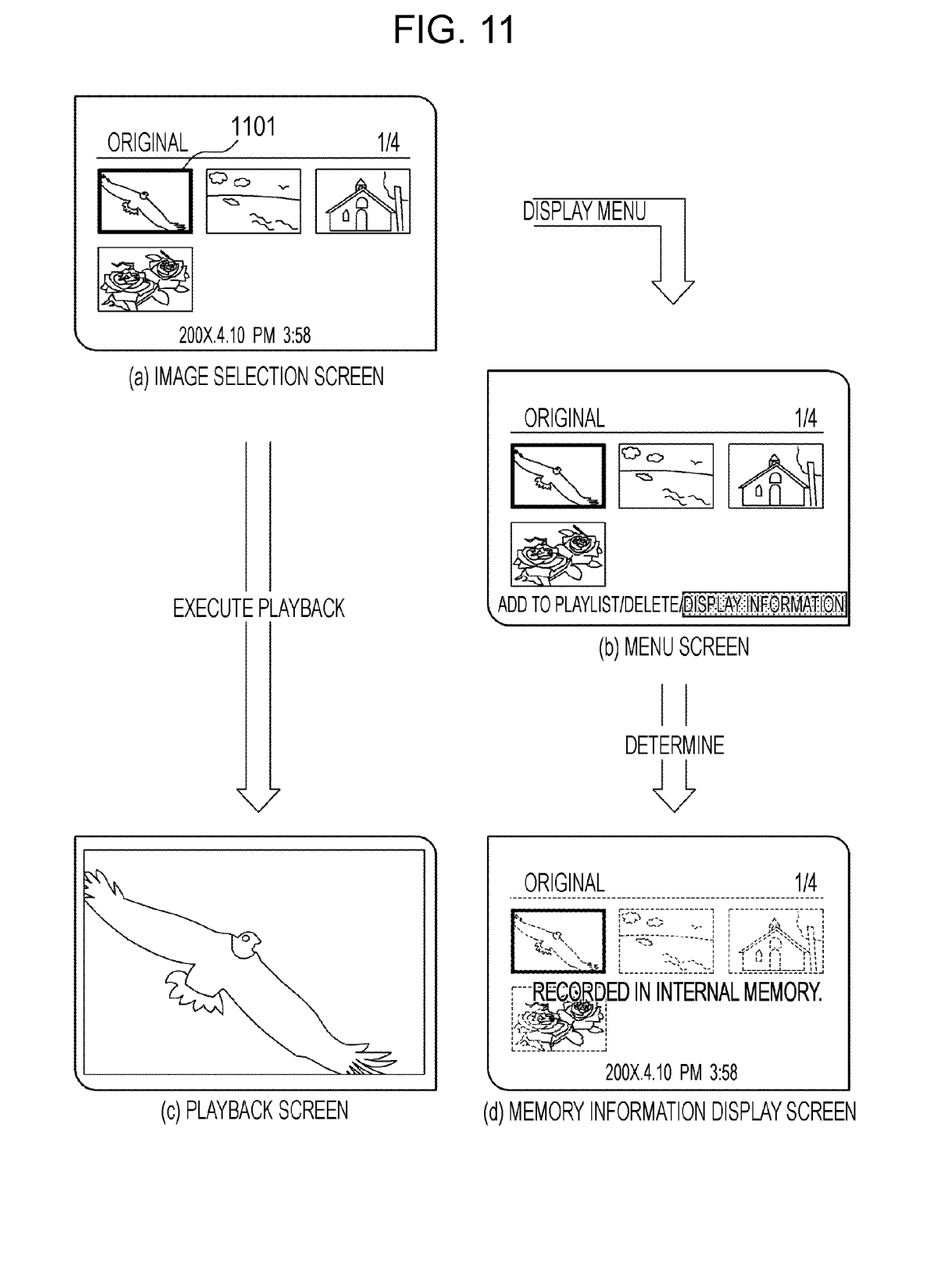
FIG. 11 illustrates examples of the transition of screens displayed, in the digital video camera of the second exemplary embodiment, when a compressed image whose corresponding picked-up image is recorded in an internal memory is selected.

FIG. 11 illustrates examples of the transition of screens displayed when a compressed image whose corresponding picked-up image is recorded in the internal memory 15 is selected. In FIG. 11, (a) illustrates an image selection screen that displays compressed images in an index format. The image selection screen of (a) in FIG. 11 allows the user to select an image by moving a focus 1101. After the selection of an image on the image selection screen of (a) in FIG. 11, if the user gives an instruction to play back the selected image, the screen transitions to a playback screen of (c) in FIG. 11 and the selected image is played back. Alternatively, after the selection of an image on the image selection screen of (a) in FIG. 11, if the user gives an instruction to display a menu, the screen transitions to a menu screen of (b) in FIG. 11. If "display information" is selected on the menu screen of (b) in FIG. 11, the screen transitions to a memory information display screen of (d) in FIG. 11. The memory information display screen of (d) in FIG. 11 displays a message indicating that the picked-up image corresponding to the selected compressed image is recorded in the internal memory 15.

Figure 12:
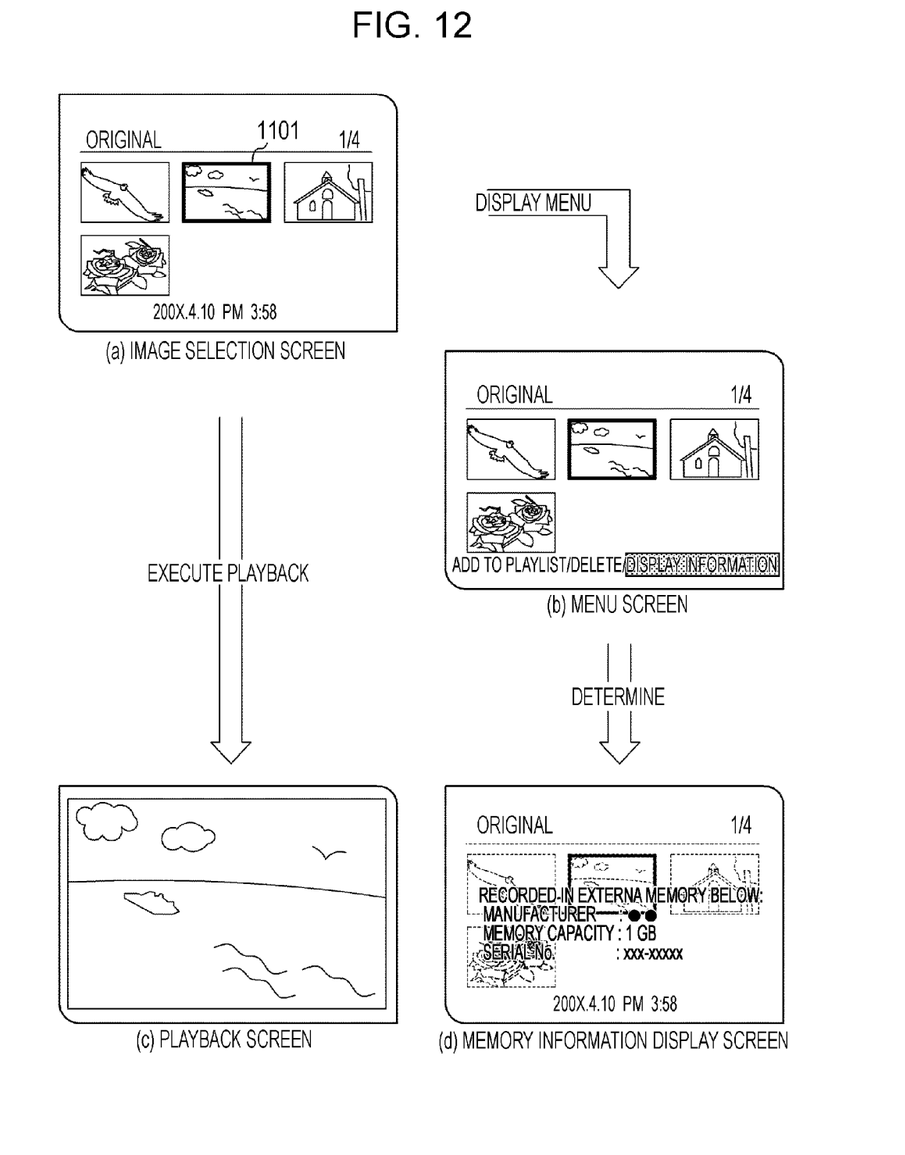
FIG. 12 illustrates examples of the transition of screens displayed, in the digital video camera of the second exemplary embodiment, when a compressed image whose corresponding picked-up image is recorded in a currently mounted external memory is selected.

FIG. 12 illustrates examples of the transition of screens displayed when a compressed image whose corresponding picked-up image is recorded in a currently mounted external memory 14 is selected. As in the case of (a) in FIG. 11, (a) in FIG. 12 illustrates an image selection screen that displays compressed images in an index format. The image selection screen of (a) in FIG. 12 allows the user to select an image by moving the focus 1101. After the selection of an image on the image selection screen of (a) in FIG. 12, if the user gives an instruction to play back the selected image, the screen transitions to a playback screen of (c) in FIG. 12 and the selected image is played back. Alternatively, after the selection of an image on the image selection screen of (a) in FIG. 12, if the user gives an instruction to display a menu, the screen transitions to a menu screen of (b) in FIG. 12. If "display information" is selected on the menu screen of (b) in FIG. 12, the screen transitions to a memory information display screen of (d) in FIG. 12. The memory information display screen of (d) in FIG. 12 displays individual information about the external memory 14 in which the picked-up image corresponding to the selected compressed image is recorded.

Figure 13:
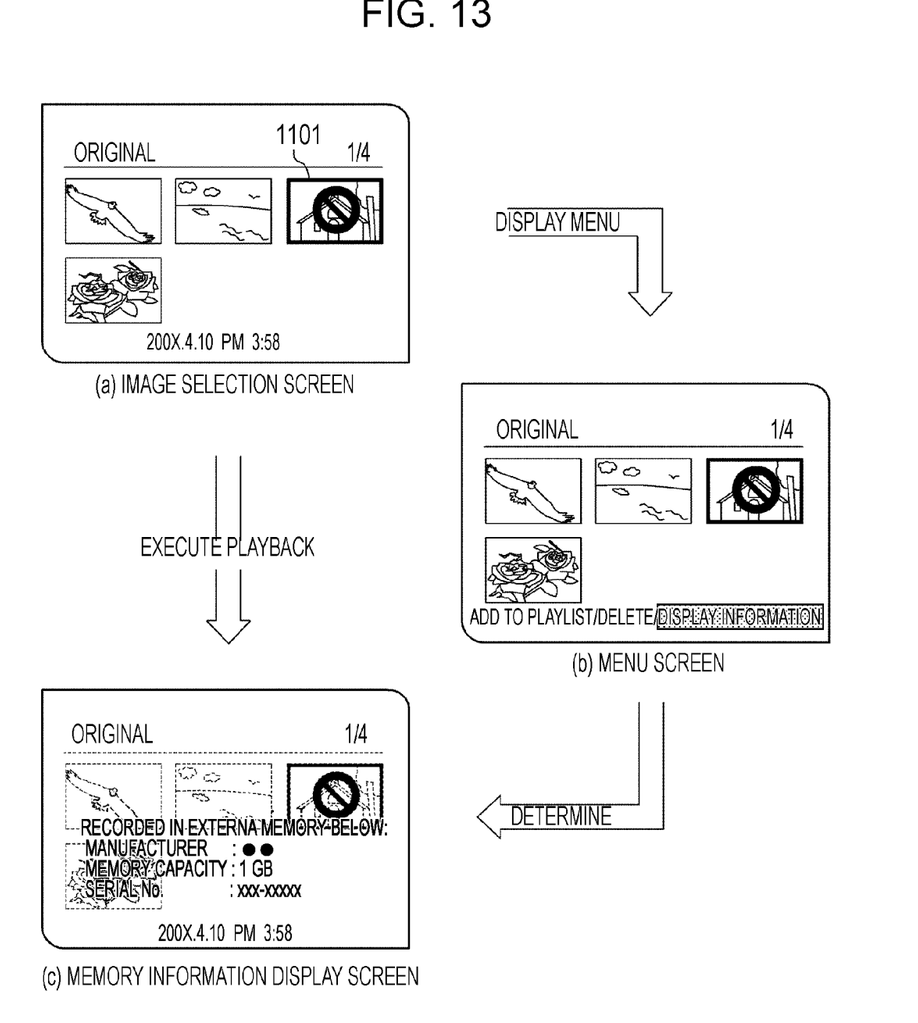
FIG. 13 illustrates examples of the transition of screens displayed, in the digital video camera of the second exemplary embodiment, when a compressed image whose corresponding picked-up image is recorded in a currently unmounted external memory is selected.

FIG. 13 illustrates examples of the transition of screens displayed when a compressed image whose corresponding picked-up image is recorded in a currently unmounted external memory 14 is selected. As in the cases of (a) in FIG. 11 and (a) in FIG. 12, (a) in FIG. 13 illustrates an image selection screen that displays compressed images in an index format. The image selection screen of (a) in FIG. 13 allows the user to select an image by moving the focus 1101. If the user selects an image on the image selection screen of (a) in FIG. 13 and gives an instruction to play back the selected image, since the corresponding picked-up image is recorded in the currently unmounted external memory 14 and thus cannot be played back, the selected image is displayed in a manner indicating that the corresponding picked-up image cannot be played back. Then, the screen transitions to a memory information display screen of (c) in FIG. 13. The memory information display screen of (c) in FIG. 13 displays individual information about the external memory 14 in which the picked-up image is recorded. If the user selects an image on the image selection screen of (a) in FIG. 13 and gives an instruction to display a menu, the screen transitions to a menu screen of (b) in FIG. 13. If "display information" is selected on the menu screen of (b) in FIG. 13, the screen transitions to a memory information display screen of (c) in FIG. 13. The memory information display screen of (c) in FIG. 13 displays individual information about the external memory 14 in which the picked-up image corresponding to the selected compressed image is recorded.

In the second exemplary embodiment described above, when a compressed image recorded in the internal memory 15 is selected, it is possible to inform the user of individual information about a memory in which a picked-up image corresponding to the selected compressed image is recorded. This can reduce the user's burden, because the user does not have to insert the external memory 14 into the digital video camera each time to identify the specific external memory 14 in which a picked-up image the user is looking for is recorded.

In the second exemplary embodiment, when an image is selected on the image selection screen, the display mode may be changed to another mode which allows display of a list of images recorded in a memory in which a picked-up image corresponding to the selected image is recorded. Alternatively, when an image is selected on the image selection screen, the display mode may be changed to another mode which allows display of each of the images recorded in a memory in which a picked-up image corresponding to the selected image is recorded.

Although the present invention has been described with reference to various exemplary embodiments, the present invention is not limited to the exemplary embodiments described above. The present invention may be changed within the scope thereof. For example, on the screen where compressed images are displayed in an index format, compressed images whose corresponding picked-up images are recorded in the currently unmounted external memory 14 may be displayed in a display format different from that for compressed images whose corresponding picked-up images are recorded in the internal memory 15 or the currently mounted external memory 14.

In the first and second exemplary embodiments described above, images may be displayed in different formats by varying the display size, brightness, contrast, or the like, or by using markers, icons, or the like.

The present invention can be provided when a storage medium in which software program code and/or computer-executable instructions for realizing the functions of the above-described exemplary embodiments is stored is supplied to a system or an apparatus. In this case, a computer (or a central processing unit (CPU) or microprocessing unit (MPU)) of the system or apparatus may read and execute the program code and/or computer-executable instructions stored in the storage medium.

In this case, the program code and/or computer-executable instructions read out of the storage medium realizes the functions according to the above-described exemplary embodiments. Therefore, the program code and/or computer-executable instructions and the storage medium storing the program code and/or computer-executable instructions constitute embodiments of the present invention.

Examples of the storage medium for supplying the program code and/or computer-executable instructions include at least one of a flexible disk, a hard disk, an optical disk, a magneto-optical disk, a compact-disk read-only memory (CD-ROM), a CD-recordable (CD-R), a magnetic tape, a non-volatile memory card, and a ROM.

As described above, the functions of the above-described exemplary embodiments are realized by executing the program code and/or computer-executable instructions read out by the computer. Additionally, for example, in accordance with an instruction of the program code and/or computer-executable instructions, an operating system (OS) or basic system running on the computer may perform all or a part of the actual processing, so that the functions according to the above-described exemplary embodiments are realized by this processing.

Furthermore, after the program code is read out of the storage medium, it can be written to a function expansion board inserted in the computer or to a memory provided in a function expansion unit connected to the computer. A CPU or the like mounted on the function expansion board or function expansion unit may perform all or a part of the actual processing, so that the functions of the above-described exemplary embodiments are realized by this processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-100807 filed Apr. 8, 2008, which is hereby incorporated by reference herein in its entirety.

What is claimed is:

1. An image processing apparatus comprising:
a display unit;
an internal recording medium;
a recording processing unit configured to control a record of a first image data on an external recording medium and a record of a second image data corresponding to the first image data on the internal recording medium;
an instruction unit configured to make an instruction of the editing process possible by displaying the second image data recorded on the internal recording medium on the display unit, under a condition not being possible to edit the first image data recorded on the external recording medium;
a storing unit configured to store a content of the editing process instructed by the instruction unit; and
an editing unit configured to perform an editing process, when it is ready to perform the editing process on the first image data recorded on the external recording medium, in accordance with the content stored in the storing unit.

2. The image processing apparatus according to claim 1, wherein the editing process includes at least one of editing operations of protecting, deleting or dividing.

3. The image processing apparatus according to claim 1, wherein the editing process includes making a playlist.

4. The image processing apparatus according to claim 1, further comprising:
an informing unit configured to inform a user that the editing process is to be performed before performing the editing process in accordance with the content stored in the storing unit after the condition become ready to edit the image data recorded in the external recording medium.

5. The image processing apparatus according to claim 1, wherein the display unit displays the compressed image which is instructed to be edited by the instruction unit in a display format different from the display format of the compressed image which is not instructed to be edited by the instruction unit.

6. An image processing method comprising:
controlling a record of a first image data on an external recording medium and a record of a second image data corresponding to the first image data on an internal recording medium;

making an instruction of the editing process possible by displaying the second image data recorded on the internal recording medium on a display unit, under a condition not being possible to edit the first image data recorded on the external recording medium;

store a content of the instructed editing process; and performing an editing process, when it is ready to perform the editing process on the first image data recorded on the external recording medium, in accordance with the stored content.

7. An image processing apparatus comprising:

a display unit;

an internal recording medium;

a recording processing unit configured to control a record of a first image data on an external recording medium and a record of a second image data corresponding to the first image data on the internal recording medium;

an instruction unit configured to make an instruction of the editing process possible by displaying the second image data recorded on the internal recording medium on the display unit, under a condition not being possible to edit the first image data recorded on the external recording medium;

a storing unit configured to store a content of the editing process instructed by the instruction unit; and a causing unit configured to cause an editing process, after the condition becomes possible to edit the first image data recorded on the external recording medium, in accordance with the content stored in the storing unit.

8. The image processing apparatus according to claim 7, wherein the editing process includes at least one of editing operations of protecting, deleting or dividing.

9. The image processing apparatus according to claim 7, wherein the editing process includes making a playlist.

10. The image processing apparatus according to claim 7, further comprising:

an informing unit configured to inform a user that the editing process is to be performed before performing the editing process in accordance with the content stored in the storing unit after the condition become ready to edit the image data recorded in the external recording medium.

11. The image processing apparatus according to claim 7, wherein the display unit displays the compressed image which is instructed to be edited by the instruction unit in a display format different from the display format of the compressed image which is not instructed to be edited by the instruction unit.

12. An image processing method comprising:

controlling a record of a first image data on an external recording medium and a record of a second image data corresponding to the first image data on an internal recording medium;

making an instruction of the editing process possible by displaying the second image data recorded on the internal recording medium on a display unit, under a condition not being possible to edit the first image data recorded on the external recording medium;

store a content of the instructed editing process; and causing an editing process, after the condition becomes possible to edit the first image data recorded on the external recording medium, in accordance with the stored content.

* * * * *